(12) United States Patent
Santos Gomez et al.

(10) Patent No.: US 10,179,253 B2
(45) Date of Patent: Jan. 15, 2019

(54) SAFETY SYSTEM FOR AUTOCLAVES

(71) Applicant: Airbus Operations, S.L., Madrid (ES)

(72) Inventors: Jose Manuel Santos Gomez, Getafe (ES); Ramón Ramos, Getafe (ES)

(73) Assignee: Airbus Operations, S.L., Getafe, Madrid (ES)

( * ) Notice: Subject to any disclaimer, the term of this patent is extended or adjusted under 35 U.S.C. 154(b) by 186 days.

(21) Appl. No.: 14/725,618

(22) Filed: May 29, 2015

(65) Prior Publication Data

US 2015/0343246 A1 Dec. 3, 2015

(30) Foreign Application Priority Data

May 30, 2014 (EP) .................................... 14382201

(51) Int. Cl.
*A62C 3/00* (2006.01)
*B29C 70/44* (2006.01)
*A62C 35/02* (2006.01)
*A62C 5/00* (2006.01)
(Continued)

(52) U.S. Cl.
CPC ................ *A62C 3/00* (2013.01); *A62C 5/006* (2013.01); *A62C 35/023* (2013.01); *A62C 99/0018* (2013.01); *B29C 35/0227* (2013.01); *B29C 70/44* (2013.01)

(58) Field of Classification Search
CPC . B29C 2037/97; B29C 44/5609; C21D 1/763; C21D 1/74; C21D 11/005; A62C 13/66; A62C 13/70; A62C 35/023; A62C 35/64

USPC .... 169/45, 11, 9, 16, 26, 27, 71, 84, 56, 60; 425/151–154; 422/295, 305, 117, 118, 422/167; 266/257

See application file for complete search history.

(56) References Cited

U.S. PATENT DOCUMENTS

| | | | | |
|---|---|---|---|---|
| 3,097,499 A | * | 7/1963 | Rodgers ................. | A62C 5/004 137/399 |
| 3,860,222 A | * | 1/1975 | Tennenhouse ......... | C21D 1/773 266/250 |

(Continued)

FOREIGN PATENT DOCUMENTS

| EP | 2 689 909 A1 | 1/2014 |
|---|---|---|
| WO | WO 2012/154050 A2 | 1/2014 |

OTHER PUBLICATIONS

Extended European Search Report for Application No. 14 382201.3 dated Nov. 27, 2014.

*Primary Examiner* — Alexander Valvis
*Assistant Examiner* — Tuongminh Pham
(74) *Attorney, Agent, or Firm* — Jenkins, Wilson, Taylor & Hunt, P.A.

(57) ABSTRACT

A system for making an autoclave inert such that flame propagation is prevented in the event of spontaneous internal combustion, which thus prevents damaging the actual system or equipment, tools and parts, for which it essentially has sodium azide capsules which produce a chemical reaction when they reach an activation temperature, releasing nitrogen, making the chamber inert, venting equipment to prevent damage due to overpressure inside the chamber when the capsules have come into action and released the gas, a main cooling circuit and an additional cooling circuit for the capsules, all of this automatically controlled and managed by a control device.

20 Claims, 2 Drawing Sheets

(51) Int. Cl.
*A62C 99/00* (2010.01)
*B29C 35/02* (2006.01)

(56) References Cited

U.S. PATENT DOCUMENTS

| | | | |
|---|---|---|---|
| 4,338,117 A * | 7/1982 | Savolskis | C03B 5/237 |
| | | | 65/158 |
| 4,515,545 A * | 5/1985 | Hinrichs | B01J 3/002 |
| | | | 425/143 |
| 4,805,881 A * | 2/1989 | Schultz | B01J 8/04 |
| | | | 266/257 |
| 5,122,318 A | 6/1992 | Bonet et al. | |
| 5,447,700 A | 9/1995 | Taricco | |
| 6,778,209 B1 * | 8/2004 | Eversole | H04N 5/2252 |
| | | | 348/65 |
| 2003/0068258 A1 * | 4/2003 | Chung | B01J 19/0006 |
| | | | 422/187 |
| 2005/0115721 A1 * | 6/2005 | Blau | A62D 1/06 |
| | | | 169/5 |
| 2008/0135266 A1 | 6/2008 | Richardson et al. | |
| 2008/0258099 A1 * | 10/2008 | Hawkins | G05D 16/0683 |
| | | | 251/367 |
| 2010/0092336 A1 * | 4/2010 | Bondar | A61L 2/206 |
| | | | 422/3 |

* cited by examiner

SAFETY SYSTEM FOR AUTOCLAVES

CROSS-REFERENCE TO RELATED APPLICATION

This application claims the benefit of and priority to European patent application No. 14 382201.3 filed on May 30, 2014, the entire disclosure of which is incorporated by reference herein.

TECHNICAL FIELD

The present disclosure relates to a safety system for autoclaves of the type used for curing and consolidating composite material parts, such that flame propagation is prevented in the event of spontaneous internal combustion, which thus prevents damaging the actual system or equipment, the tools and parts.

More specifically, the disclosure herein relates to an automatic system which allows extinguishing the flame in the event of spontaneous combustion of the volatile gases generated during the curing process inside the pressurized autoclave, generating a gas that makes the environment inert fast enough so as to eliminate the risk of damaging the part, tool and pieces of equipment.

BACKGROUND

Today it is widely known that the aeronautics industry requires structures which, on one hand, bear the loads to which they are subjected in order to comply with high strength and rigidity requirements and which, on the other hand, are as lightweight as possible.

These requirements result in the increasingly greater widespread use of composite materials in primary structures since by suitably applying the composite materials, significant weight savings can be achieved with respect to designs with another type of materials, such as metallic materials, for example.

Integrated structures have proven to be very efficient in this sense, integrated structure being understood as that structure in which the different structural elements are manufactured all at once. This involves an additional advantage in the use of the composite materials because since they are formed by independent layers, they can be gradually stacked on one another in various shapes and orientations to form the desired structure.

This also entails the advantage of a reduced number of parts to be assembled, which means essential cost savings for competing on the market.

Generally, the mentioned structures usually consist of a skin with integrated stringers, glued or cured together, normally arranged longitudinally with respect to the skin to enable reducing its thickness and making it competitive with respect to weight without this jeopardizing the mechanical properties of the assembly.

This assembly formed by the skin plus the stringers can be manufactured in a single manufacturing process which, generally speaking, comprises the following steps:

Stacking the layers of composite material on a base;
Folding to form the parts into the desired shape;
Superimposing layers of composite material in a pre-impregnated state, such that it allows rolling and forming without producing fiber distortions or creases, and such that it allows the ultimately cured part to not have permanent deformations due to thermal stresses;
Placing in the curing tool; and finally
Curing the complete structure by applying a single pressure and temperature cycle.

In the current state of the art, the mentioned part curing process involves using high-temperature (more than 180° C.) and high-pressure (more than 10 bar relative pressure) heating cycles. To that end, the use of autoclaves is known, particularly in the field of aviation, in which the autoclaves are accordingly quite large.

However, the high temperatures and pressures to which these parts are subjected inside the autoclave result in the occurrence of the risk of deflagration caused by the presence of volatile compounds generated during the polymerization process of the resins making up the part to be cured.

This problem is sometimes solved by using anti-deflagration autoclaves designed such that their casing is robust enough so as to withstand an internal gas explosion without sustaining damage and of placing anti-deflagration openings consisting of flange joints, for example, so that the flame cannot propagate to the outside atmosphere.

This solution, however, entails a significantly higher autoclave price, so such autoclaves are not applicable in the field of aeronautics where a large size is required. Furthermore, the use of the system does not prevent deflagration, but rather controls its effects, so both the part being cured and the pieces of equipment, tools, etc., would continue to be produced, which is something to be avoided at any cost in this field due to high material and labor costs.

Another solution known in the state of the art to prevent deflagrations inside autoclaves or any enclosure is to make the inner atmosphere thereof inert by high-pressure injection of inert gases such as molecular nitrogen, carbon dioxide, etc., reducing the amount of oxygen and therefore stopping combustion. In the case of autoclaves, such gases do not provide any benefit/cause any harm to the process since they do not confer any additional quality or property to the part, but due to the low proportion of oxygen in the inner atmosphere, they do assure that flame propagation does not occur in the event that the combination of high temperatures, high pressures and a release of volatile substances may provoke same.

Therefore, taking advantage of the fact that it is necessary to maintain high pressure inside the autoclave for correctly performing the curing process, the pressure is achieved by injecting that inert gas, typically nitrogen, which is abundant in nature and non-toxic and on the other hand creates the inert atmosphere preventing deflagrations from occurring.

However, these inerting systems using nitrogen have the drawback of the substantial environmental impact involved due to the high electrical power needs required for generating same every time the system is used, since the gas used for pressurization and for creating the inert atmosphere is lost upon opening the chamber if there are no recovery systems, something that tends to occur in those installations with a single autoclave. On the other hand, in manufacturing plants where there are several autoclaves and a nitrogen recovery system is implemented, it would nonetheless have to be taken into account that prior gas storage in cylinders or containers also involves a high financial cost and greater installation complexity.

Finally, another drawback of these systems in which the inside of the autoclave is made inert using nitrogen is that for the inert atmosphere created to be effective, the gas must be homogenously distributed inside the autoclave, which also involves an additional problem as it will make installing auxiliary forced ventilation systems homogeneously distributing the gas necessary. All this evidently has an impact on the final price of the parts obtained by this system, and therefore results in a loss of competitiveness.

A system for making an autoclave inert that is fast and effective enough so as to prevent deflagration that damages the part, tool or the autoclave itself, while at the same time minimizing the amount of gas to be used and simplifying the structure of the assembly so that the cost for curing parts is competitive, is therefore necessary in the state of the art.

SUMMARY

A safety system for autoclaves of the present disclosure solves the problems of the state of the art mentioned above because, in addition to being capable of effectively making the chamber of an autoclave inert at a high speed regardless of its size, it uses a small amount of gas which can furthermore be recycled, all this with a simple and therefore low-cost structure.

Specifically, the present disclosure describes an inerting system for an autoclave capable of making the inside of the autoclave inert in a time of 40 milliseconds at the most.

To that end, and more specifically, the system of the disclosure herein comprises a set of capsules in turn comprising sodium azide, $NaN_3$, which produces a high-speed chemical reaction at an activation temperature of about 300° C., releasing nitrogen according to the reaction:

$$2NaN_3 \rightarrow 2Na + 3N_2$$

Therefore, by placing the capsules close to the heat sources inside the autoclave and/or in those places where deflagration or spontaneous combustion may start, the capsules will react at a high speed when they reach their activation temperature of 300° C., which is much higher than those commonly used during the curing process, which is typically 180° C. Therefore, when they reach the activation temperature inside the autoclave, it will be assumed that spontaneous combustion or deflagration has started, releasing nitrogen $N_2$ in that instant at a high speed in the form of gas and making the chamber inert to quench the flames immediately.

Although sodium azide $NaN_3$ is known in the state of the art as a high-speed gas generator, it is used together with accelerants and detonating agents typically for filling vehicle air-bags or aircraft evacuation ramps, the use thereof in the state of the art as a flame inhibiting or extinguishing element not being known.

The inerting system for autoclaves proposed by the disclosure herein will therefore allow the autoclave to be pressurized using air alone and not by using nitrogen or another inert gas, since the sodium azide $NaN_3$ capsules will be responsible for making the inside thereof inert, if necessary, which will result in considerable savings as explained above.

BRIEF DESCRIPTION OF THE DRAWINGS

To complement the description that is being made and for the purpose of aiding to better understand the features of the disclosure herein according to a preferred practical embodiment thereof, a set of drawings is attached as an integral part of the description in which the following is depicted with an illustrative and non-limiting character.

DETAILED DESCRIPTION

Figure 1:
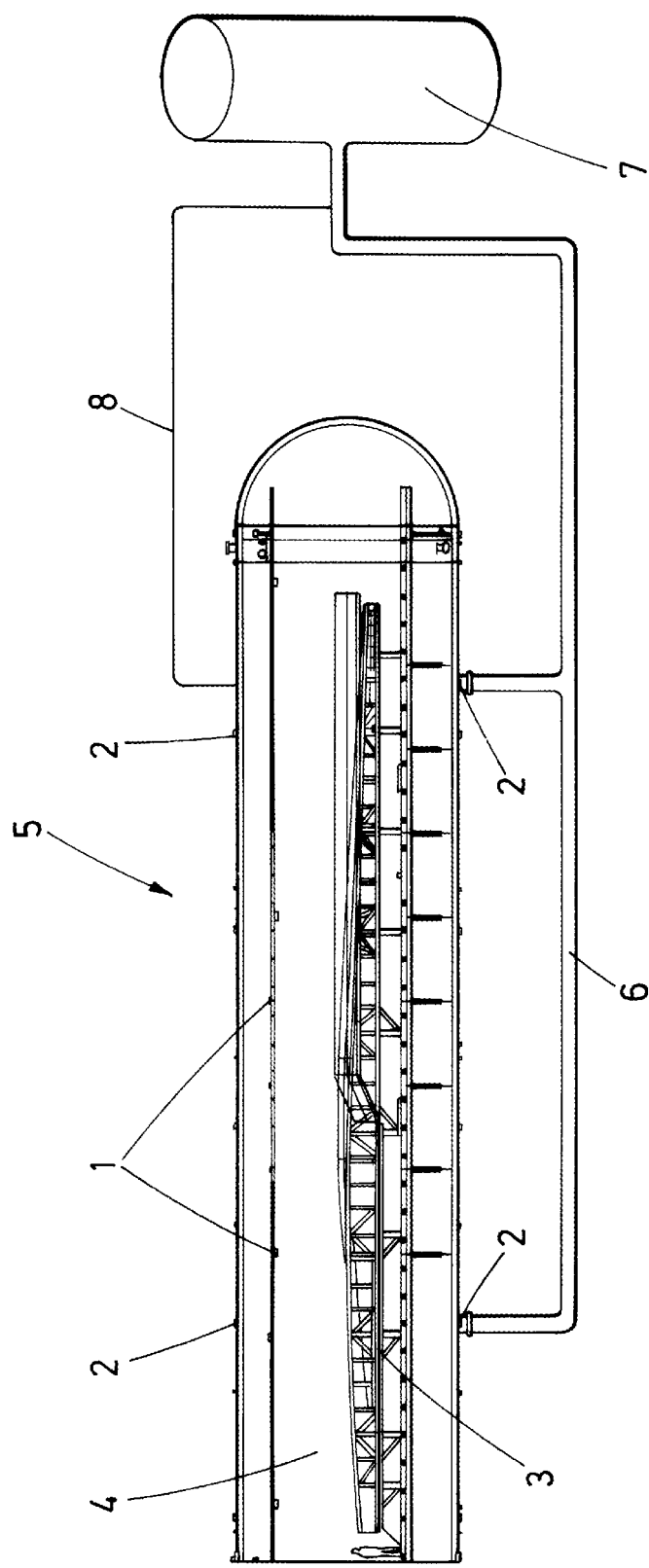
FIG. 1 shows a longitudinal section view of an autoclave in which the safety system of the disclosure herein has been installed.
Figure 2:
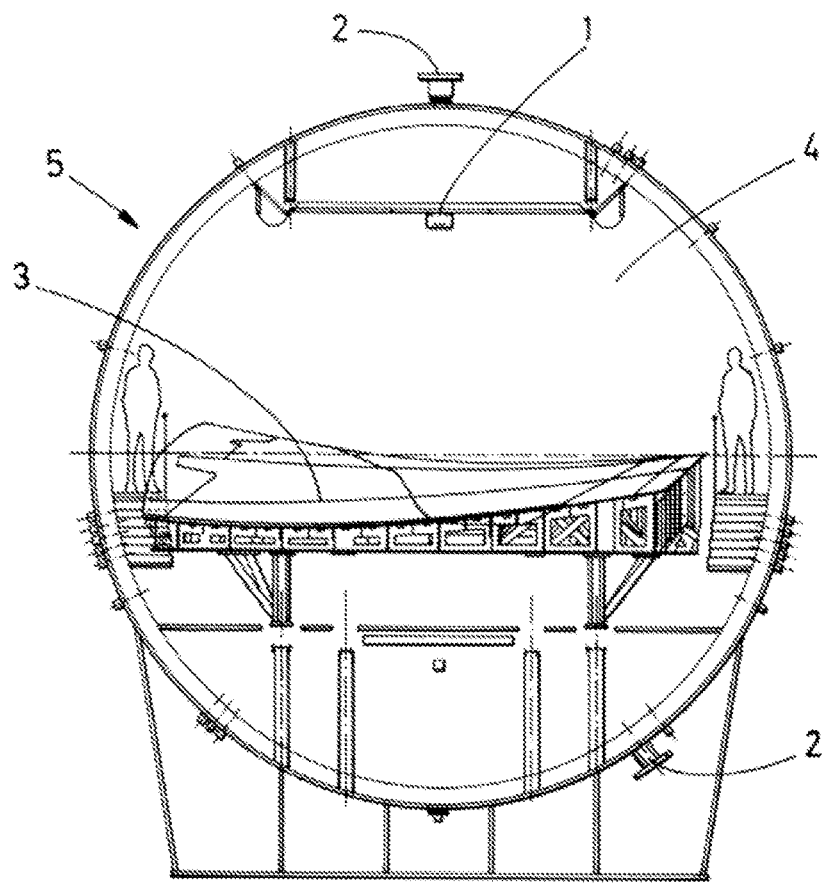
FIG. 2 shows a cross-section view of the autoclave of the preceding figure.

As seen in the drawings, the system of the disclosure herein comprises at least one capsule (1) in turn comprising sodium azide, $NaN_3$, the activation of which occurs at a temperature of about 300° C., and which, as mentioned above, produces a high-speed chemical reaction, releasing nitrogen according to the reaction:

$$2NaN_3 \rightarrow 2Na + 3N_2$$

According to a possible practical embodiment of the disclosure herein, the capsules (1) are placed as closed as possible to the heat sources inside the autoclave (5) and/or in those places where deflagration or spontaneous combustion may start, such that the part (3) to be cured is protected as much as possible.

The system is further provided with a venting equipment to prevent damage due to overpressure inside the chamber (4) of the autoclave (5) when the capsules (1) have come into action and released the $N_2$ gas by the chemical reaction.

The venting equipment comprises fast opening automatic valves (2) located inside the autoclave (5), which are connected to a network of pipes (6) through which excess gas inside the chamber (4) will be conducted to one or several high-pressure auxiliary tanks (7) where the liquefied gas can be stored.

For cooling the chamber (4) of the autoclave (5) once the curing processes have ended, the safety system of the disclosure herein comprises a main cooling circuit (8) fed with liquefied gas stored in the auxiliary tanks (7).

On the other hand, it just so happens that in the curing operations of certain parts, for example, parts made of thermoplastic materials, the temperature in the chamber (4) of the autoclave (5) can reach 400° C. This means that the activation temperature of sodium azide, $NaN_3$, established at about 300° C., is greatly exceeded, so it is necessary to prevent the safety system of the disclosure herein from being activated in those cases in which the temperature inside the chamber (4) increases as a result of the curing process and not deflagration or spontaneous combustion.

To that end, the safety system of the disclosure herein comprises an additional cooling circuit responsible for preventing the capsules (1) from exceeding the activation temperature. The additional cooling circuit will therefore comprise a cooling element (9) for each of the capsules (1) or groups of capsules (1), if they are grouped together, inside the chamber (4).

Figure 3:
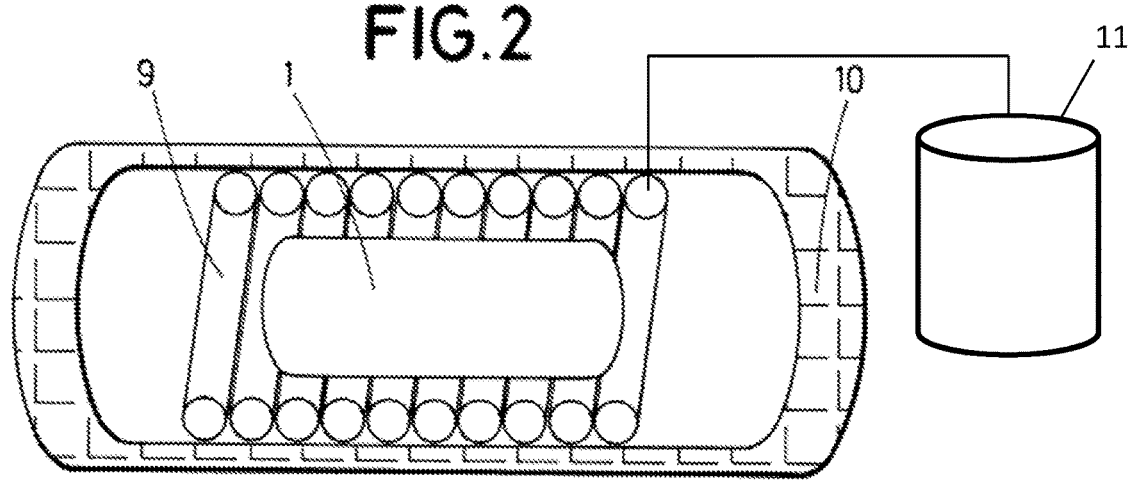
FIG. 3 shows a schematic view of the assembly formed by the sodium azide capsule, the cooling element and the cover.

According to a possible embodiment of the disclosure herein shown in FIG. 3, the cooling element (9) is formed by a coil-like circuit completely or partially enveloping the capsule (1) in order to keep the temperature around it below the activation temperature.

The additional cooling circuit could also be integrated together with the main cooling circuit (8) or be independent, and it could also use the same auxiliary tanks (7) or have its own liquefied gas container (11).

Furthermore, in order to prevent the capsules (1) from being activated in cases where the curing temperatures are above the activation temperature of sodium azide with greater certainty, the capsules of the system could additionally comprise a protective cover (10) enveloping both the capsule (1) and the cooling element (9). To that end, the protective cover (10) will be made, for example, of rock wool or any other such structural material which, while capable of withstanding the temperatures inside the chamber (4), does not hinder or stop the chemical reaction, i.e., does not prevent expansion of the $N_2$ produced due to sodium azide activation for correctly making the chamber (4) inert.

To automatically manage the entire assembly, the system of the disclosure herein further comprises a control device (not depicted) which, by the corresponding control software, will be responsible for managing the signals provided by a set of sensors intended for monitoring different parameters inside the chamber (4). Among the parameters, the pressure, temperature and vacuum parameters will be constantly controlled such that the control device can put the venting equipment, the main cooling circuit and the additional cooling circuit into operation if the established pressure and temperature values are exceeded.

In other words, during normal autoclave operation, as the name suggests, the control device is responsible for continuously controlling and monitoring all the temperature, pressure and vacuum parameters inside the autoclave, and for managing the difference between the temperature detected inside the autoclave and the temperature established as the activation temperature such that the difference is suitable both to facilitate correct operation of the curing cycle and to operate the system of the disclosure herein in the event of detecting an anomalous temperature due to deflagration or even a heating system malfunction.

Therefore, according to a possible preferred embodiment of the disclosure herein, a method of operating an autoclave having the described system and in which a part (3) to be cured has been introduced into the chamber (4), progressively increasing the temperature and pressure therein, would comprise the following steps:

Continuously monitoring the temperature inside the chamber to detect:
  a) If the temperature in the chamber increases due to deflagration or spontaneous combustion, in which case:
    a.1 The temperature in the chamber is allowed to reach the activation temperature of the sodium azide capsules (1);
    a.2 Once the capsules (1) are activated and the gas is released, the inside of the chamber (4) is vented to prevent damage due to overpressure inside the chamber (4).
    a.3 The gas extracted from inside the chamber (4) is conducted to an auxiliary tank (7) for storage and recycling.
  b) If the temperature in the chamber is higher than the activation temperature of the sodium azide capsules (1) because it is needed for curing the part (3), in which case:
    b.1 The temperature in the chamber is allowed to exceed the activation temperature of the sodium azide capsules (1), cooling the capsules (1) locally, preventing their activation.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority. Other preferred embodiments of the present disclosure are described in the appended dependent claims and the multiple combinations thereof.

The invention claimed is:

1. A system comprising:
   an autoclave;
   a safety system for making an inside of an inner chamber of the autoclave inert, the safety system comprising one or more capsules comprising sodium azide, $NaN_3$, which produces a chemical reaction when the capsule reaches an activation temperature, releasing nitrogen gas and making the inner chamber inert;
   a main cooling circuit fed with liquefied gas stored in one or more auxiliary tanks; and
   an additional cooling circuit for each of the one or more capsules or groups of capsules, wherein the additional cooling circuit is separate from the main cooling circuit.

2. The system according to claim 1, comprising venting equipment to prevent damage due to an overpressure condition inside the inner chamber when at least one of the one or more capsules are activated and release the nitrogen gas, wherein the venting equipment comprises automatic valves.

3. The system according to claim 2, wherein the venting equipment comprises:
   the one or more auxiliary tanks, which are located outside the autoclave; and
   a network of pipes, through which excess gas inside the inner chamber is conducted through the automatic valves to the one or more auxiliary tanks for storage in the one or more auxiliary tanks.

4. The system according to claim 1, wherein the additional cooling circuit comprises a cooling element in a form of a coil completely or partially enveloping the capsule.

5. The system according to claim 4, wherein the additional cooling circuit is independent of the main cooling circuit and comprises a liquefied gas container.

6. The system according to claim 4, comprising a protective cover enveloping both the one or more capsules and the cooling element to prevent the one or more capsules from reaching the activation temperature when an internal temperature of the autoclave is set higher than the activation temperature, wherein the protective cover is configured to allow expansion of the nitrogen gas, which is produced due to activation of the $NaN_3$, through the protective cover.

7. The system according to claim 2, comprising a control device for managing and controlling the venting equipment, the main cooling circuit, and the additional cooling circuit when pressure and/or temperature values established inside the chamber are exceeded.

8. A safety system for autoclaves to render inert an inside of an inner chamber thereof, the safety system comprising:
   one or more capsules comprising sodium azide ($NaN_3$), which produces a chemical reaction when an activation temperature of the one or more capsules is reached, wherein the chemical reaction releases nitrogen gas to render the inner chamber of the autoclave inert;
   a main cooling circuit supplied with liquefied gas stored in one or more auxiliary tanks; and
   an additional cooling circuit for each of the one or more capsules or groups of the one or more capsules, wherein the additional cooling circuit is separate from the main cooling circuit.

9. The safety system according to claim 8, comprising venting equipment to prevent damage due to an overpressure condition inside the chamber when the one or more capsules are activated to release the nitrogen gas, wherein the venting equipment comprises automatic valves.

10. The safety system according to claim 9, wherein the venting equipment comprises a network of pipes configured to conduct excess gas from the inside of the inner chamber, via the automatic valves, to the one or more auxiliary tanks.

11. The safety system according to claim 9, comprising a control device configured to manage and control the venting equipment, the main cooling circuit, and the additional cooling circuit when pressure and/or temperature values established inside the inner chamber are exceeded.

12. The safety system of claim 8, wherein the additional cooling circuit comprises a cooling element in a form of a coil that completely or partially envelopes at least one of the one or more capsules.

13. The safety system of claim 12, comprising a protective cover enveloping the cooling element and the capsules enveloped by the cooling element, wherein the protective cover is configured to prevent capsules enveloped by the protective layer from reaching the activation temperature when an internal temperature of the autoclave is set higher than the activation temperature, wherein the protective cover is configured to allow expansion of the nitrogen pas, which is produced due to activation of the $NaN_3$, through the protective cover.

14. The safety system of claim 8, wherein the additional cooling circuit is independent of the main cooling circuit and comprises a liquefied gas container.

15. A system comprising:
an autoclave;
a safety system for making an inside of an inner chamber of the autoclave inert, the safety system comprising one or more capsules comprising sodium azide, $NaN_3$, which produces a chemical reaction when the capsule reaches an activation temperature, releasing nitrogen in a form of gas, making the inner chamber inert, wherein the one or more capsules are located within the autoclave;
a main cooling circuit fed with liquefied gas stored in one or more auxiliary tanks; and
an additional cooling circuit for each of the one or more capsules or groups of capsules, wherein the additional cooling circuit is separate from the main cooling circuit.

16. The system of claim 15, comprising venting equipment to prevent damage due to an overpressure condition inside the chamber when the one or more capsules are activated to release the nitrogen gas, wherein the venting equipment comprises:
automatic valves; and
a network of pipes, through which excess gas inside the inner chamber is conducted through the automatic valves to the one or more auxiliary tanks for storage in the one or more auxiliary tanks.

17. The system according to claim 16, comprising a control device for managing and controlling the venting equipment, the main cooling circuit, and the additional cooling circuit when pressure and/or temperature values established inside the chamber are exceeded.

18. The system according to claim 15, wherein the additional cooling circuit comprises a cooling element in a form of a coil completely or partially enveloping the capsule.

19. The system according to claim 18, comprising a protective cover enveloping both the one or more capsules and the cooling element to prevent the one or more capsules from reaching the activation temperature when an internal temperature of the autoclave is set higher than the activation temperature, wherein the protective cover is configured to allow expansion of the nitrogen gas, which is produced due to activation of the $NaN_3$, through the protective cover.

20. The system according to claim 15, wherein the additional cooling circuit is independent of the main cooling circuit and comprises a liquefied gas container.

* * * * *